United States Patent
Nakajima et al.

(10) Patent No.: US 7,168,279 B2
(45) Date of Patent: Jan. 30, 2007

(54) METHOD OF MANUFACTURING METAL RING FOR ENDLESS METAL BELT

(75) Inventors: Katsuyuki Nakajima, Sayama (JP); Hitoshi Imai, Sayama (JP); Masanobu Ishikawa, Sayama (JP); Hiroshi Takeda, Sayama (JP); Tomomi KoSaka, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/546,566

(22) PCT Filed: Feb. 20, 2004

(86) PCT No.: PCT/JP2004/002000

§ 371 (c)(1),
(2), (4) Date: Aug. 19, 2005

(87) PCT Pub. No.: WO2004/076094

PCT Pub. Date: Sep. 10, 2004

(65) Prior Publication Data

US 2006/0144112 A1  Jul. 6, 2006

(30) Foreign Application Priority Data

Feb. 26, 2003  (JP)  ............................. 2003-048757

(51) Int. Cl.
B21D 15/00  (2006.01)

(52) U.S. Cl. .......................... 72/111; 72/252.5; 451/49; 492/1

(58) Field of Classification Search .................. 72/110, 72/111, 197, 198, 252.5, 412, 416, 703; 492/1, 492/30, 37; 451/49, 51; 29/895, 895.33, 29/90.01

See application file for complete search history.

(56) References Cited

U.S. PATENT DOCUMENTS 5,152,047 A * 10/1992 Kojima et al. ................. 29/411

(Continued)

FOREIGN PATENT DOCUMENTS

EP  1 055 738 A2  11/2000

(Continued)

Primary Examiner—Ed Tolan
(74) Attorney, Agent, or Firm—Birch, Stewart, Kolasch & Birch, LLP

(57) ABSTRACT

A metal ring with smaller stress concentration is manufactured, and the manufacture and maintenance of a rolling roller for transferring a mesh-shaped unevenness to the metal ring is facilitated. A mesh-like unevenness 8 is formed to the surface of an inner circumference rolling roller 6. This unevenness 8 is formed by rotating the inner circumference rolling roller 6 at a predetermined speed, and moving a grinder 9 back and forth in the axial direction of the inner circumference rolling roller 6 while biasing the grinder toward the surface of the roller 6 with predetermined force. The grain size of the grinder is between #270 and #1000. When the inner circumferential surface of the metal ring 1 is rolled using the inner circumference rolling roller 6, a mesh-like unevenness 2 is transferred onto the metal ring 1. Since the mesh-like unevenness 2 is formed by transferring the unevenness 8 having been formed by the grinder 9, the pitch of the unevenness is narrow and random, thus the laminated metal ring 1 exerts good lubricity. Moreover, by subjecting the metal ring 1 to solution treatment and nitriding treatment, a metal ring 1 having high compressive residual stress and enhanced toughness is formed.

3 Claims, 2 Drawing Sheets

U.S. PATENT DOCUMENTS 5,640,868 A * 6/1997 Lauener .................. 72/110
6,318,140 B1 * 11/2001 Yamagishi et al. ......... 72/110
6,783,439 B1 * 8/2004 Akagi et al. .................. 451/49

FOREIGN PATENT DOCUMENTS

| | | | |
|---|---|---|---|
| JP | 55-103133 A | 8/1980 |
| JP | 58-82672 A | 5/1983 |
| JP | 61-79041 A | 4/1986 |

* cited by examiner

METHOD OF MANUFACTURING METAL RING FOR ENDLESS METAL BELT

This application is a 35 USC 371 PCT/JP04/02000 filed Feb. 2, 2004.

1. Technical field

The present invention relates to a method for manufacturing a thin-sheet metal ring for use in an endless metal belt.

2. Background Art

Belts for transmitting power in a continuously variable transmission are formed by bonding together a plurality of elements that are arranged and stacked annularly using laminated rings. The laminated rings are formed by laminating a plurality of metal rings. The metal rings used to form this type of laminated rings receive load in the laminated state, by which friction is caused to occur between the metal rings. Therefore, lack of lubrication between the metal rings may cause drawbacks such as generation of heat or seizing of adjacent metal rings due to friction. In this connection, Japanese Patent Laid-Open Publication No. S55-103133 discloses a prior art metal ring having a mesh-like unevenness formed to the inner circumferential surface of the ring, and creating a lubricant film using this mesh-like unevenness (refer to page 2 and FIG. 1 of the publication).

A known method for forming a mesh-like unevenness on the inner circumferential surface of a metal ring comprises forming grooves on the surface of a rolling roller for rolling the metal ring, and rolling the metal ring using this rolling roller to thereby transfer the groove unevenness to the surface of the metal ring to form projections thereto. Japanese Patent Laid-Open Publication No. S61-79041 discloses forming grooves one at a time on the surface of the rolling roller using a single-grain diamond. Actually, the single-grain diamond is pressed onto the surface of a rotating rolling roller, and the diamond is moved back and forth within the predetermined width of the rolling roller in the axial direction, in order to form the mesh-like projection on the surface (refer to page 4 and FIG. 9 of the publication).

The grooves formed in the manner disclosed in Japanese Patent Laid-Open Publication No. S61-79041 are processed using a single-grain diamond or the like, so unless the width between the grooves is widened to a certain level, the processing of the rolling roller takes too much time. Thus, there is a large distance between each groove of the mesh-like grooves according to the prior art. However, when the distance between the grooves is widened, the projections formed to the surface of the metal ring by transferring the groove unevenness tend to receive concentrated stress. Especially when the metal ring is subjected to nitriding treatment as surface hardening treatment, the compressive residual stress occurring on the surface of the metal ring may be concentrated on the projection, causing deterioration of durability.

According further to the prior art method for manufacturing a metal ring, the grooves are formed one at a time using a single-grain diamond, so the processing of the rolling roller takes time. Moreover, when the grooves on the surface of the rolling roller are worn during use and can no longer transfer the predetermined unevenness to the metal ring, the surface of the rolling roller must first be polished to eliminate the grooves before creating new grooves thereto. Thus, according to the prior art, the processing and maintenance of the rolling roller required much man-hour.

The present invention aims at improving the method for manufacturing a thin-sheet metal ring for use in an endless metal belt. In further detail, the present invention aims at solving the problems mentioned above by manufacturing a metal ring with reduced stress concentration. Another object of the present invention is to provide a method for manufacturing a metal ring that utilizes a rolling roller for rolling the metal ring that is easy to manufacture and maintain.

DISCLOSURE OF THE INVENTION

In order to achieve the above objects, the present invention provides a method for manufacturing a thin-sheet metal ring for use in an endless metal belt, comprising a rolling step for rolling the metal ring using a rolling roller, wherein a mesh-like unevenness is formed on at least a surface of the rolling roller coming into contact with an inner circumferential surface of the metal ring, the mesh-like unevenness on the rolling roller is formed by applying a grinder having a predetermined coarseness on a rotating rolling roller and moving the grinder in an axial direction of the roller, and the mesh-like unevenness formed on the rolling roller is transferred to the metal ring during the rolling step.

According to the method for manufacturing a metal ring of the present invention, the mesh-like unevenness on the metal ring is formed by transferring the mesh-like unevenness formed to the rolling roller using a grinder with a predetermined coarseness. Therefore, the present invention enables to form an unevenness having a narrower size and width compared to the projections formed by transferring the grooves created using diamond according to the prior art. Thus, stress concentration on the mesh-like unevenness can be suppressed.

Further, unlike the prior art method, there is no need to form the mesh-like unevenness on the rolling roller one groove at a time using a single-grain diamond or the like. Therefore, the mesh-like unevenness can be formed easily on the surface of the rolling roller. When the unevenness on the rolling roller is worn by use, a new mesh-like unevenness can be formed over the worn unevenness using the above-mentioned grinder. Unlike the prior art method, there is no need according to the present invention to polish the surface of the roller before forming a new groove thereto, so the maintenance of the rolling roller is facilitated.

According to the present method for manufacturing a metal ring, if the width of the grooves of the mesh-like unevenness on the rolling roller is formed randomly between 25 µm and 250 µm, stress concentration on the meshed unevenness can be suppressed. In this description, the term random means that the width of the groove is not fixed but varied.

The rolling roller of the present invention can have a mesh-like unevenness newly formed thereto by processing a surface of the mesh-like unevenness that has been worn through use with the grinder. Since the mesh-like unevenness is formed using a grinder, there is no need to polish the surface of the rolling roller as in the prior art method, so the mesh-like unevenness can be formed easily.

According further to the present method for manufacturing a metal ring, it is preferable that the metal ring is made of maraging steel, the grinder for processing the rolling roller has a coarseness in the grain size range between #270 and #1000, and a nitriding treatment for nitriding the metal ring is performed after the rolling step.

The surface of the metal ring on which the mesh-like unevenness is transferred has an increased surface area due to the unevenness, so nitriding can be performed smoothly. Further, the nitriding process creates compressive residual stress on the surface of the metal ring. The present inventors discovered through experiment that in order for the metal ring to have good durability, it is preferable that the maraging steel has a compressive residual stress of approximately −980 N/mm$^2$ or more. By using a grinder with a coarseness in the grain size range between #270 and #1000, the compressive residual stress of the metal ring can be set to approximately −980 N/mm$^2$ or more.

Moreover, in consideration of the condition of the mesh-like unevenness and the life of the grinder, it is preferable that the grinder for processing the rolling roller has a coarseness in the grain size range between #300 and #800.

Furthermore, according to the present method for manufacturing a metal ring, it is preferable that a solution treatment for solution treating the metal ring is performed to the metal ring after the rolling step and prior to the nitriding treatment. When the metal ring is subjected to a solution treatment after being rolled, the crystal grain size of the metal ring becomes very fine. If the metal ring is subjected to nitriding treatment in this state, the fine grains are hardened uniformly, by which stress concentration is suppressed and fracture of the metal ring is avoided.

BEST MODE FOR CARRYING OUT THE INVENTION

Figure 1:
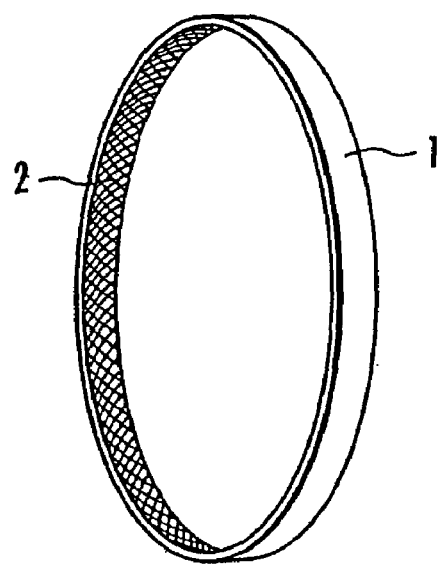
FIG. 1 is an explanatory view showing a metal ring formed by the manufacturing method according to an embodiment of the present invention.

One preferred embodiment of the method for manufacturing a metal ring according to the present invention will now be described with reference to FIGS. 1 through 4. First, the structure of a metal ring 1 is explained with reference to FIG. 1. The metal ring 1, as shown in FIG. 1, is formed in the shape of a thin-sheet endless belt, for use in an endless metal belt of a belt-type continuously variable transmission. A mesh-like unevenness 2 is formed on the inner circumferential surface thereof, but no such processing is provided to the outer circumferential surface thereof, which is smooth.

Next, the main portion of a rolling apparatus 3 for rolling the metal ring 1 will be explained with reference to FIG. 2. The rolling apparatus 3 according to the present embodiment has a pair of tension rollers 4a and 4b which are placed horizontally apart from each other by a predetermined distance for supporting a thin-sheet metal ring 1 thereon. The rolling apparatus also has a receive roller 5, an inner circumference rolling roller 6 and an outer circumference rolling roller 7, which are arrayed perpendicularly at the intermediate position between the tension rollers 4a and 4b. The outer circumference rolling roller 7 is disposed above the inner circumference rolling roller 6, and can be moved up and down. The outer circumference rolling roller 7 grips the metal ring 1 between itself and the inner circumference rolling roller 6 supported by the receive roller 5. Further, the outer circumference rolling roller 7 is driven to rotate by a motor not shown disposed on the back side thereof, thereby rolling the metal ring 1.

Figure 3:
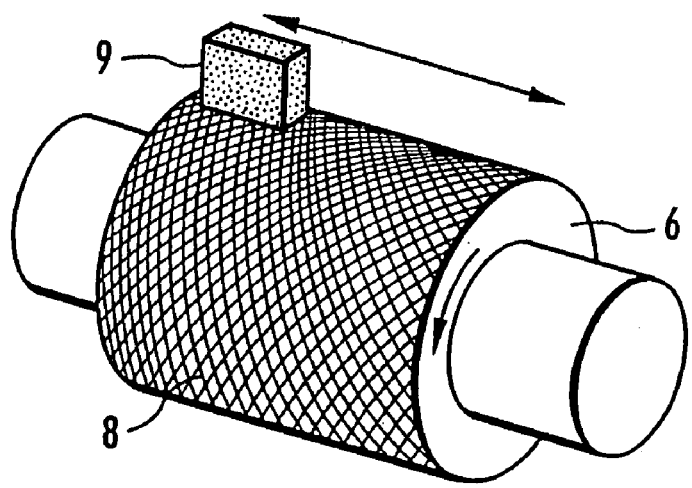
FIG. 3 is an explanatory view showing an inner circumference rolling roller for rolling the inner circumferential surface of the metal ring.

Next, the inner circumference rolling roller 6 and the method for processing the same will be described with reference to FIG. 3. As shown in FIG. 3, the inner circumference rolling roller 6 according to the present embodiment has a mesh-like unevenness 8 formed on the surface thereof. The method for forming the mesh-like unevenness 8 is as follows. First, the inner circumference rolling roller 6 is rotated at a predetermined speed. Next, a grinder 9 is pressed with predetermined force to the surface of the inner circumference rolling roller 6 and moved back and forth in the axial direction of the inner circumference rolling roller 6. By applying the grinder 9 on the surface of a rotating inner circumference rolling roller 6 and moving the same back and forth in the axial direction, the mesh-shaped unevenness 8 is formed on the surface of the inner circumference rolling roller 6.

The grinder 9 of the present embodiment utilizes a grinder made of diamond, and the grain size of the grinder is #325. The present inventors discovered through experiment that if a grinder with a grain size coarser than #270 is used, the mesh-like unevenness 8 formed to the surface of the inner circumference rolling roller 6 becomes too coarse, which is not preferable since it causes stress concentration on the unevenness 2 when transferred to the surface of the metal ring 1. Further, if a grinder with a grain size finer than #1000 is used, the depth of the unevenness 2 transferred to the surface of the metal ring 1 becomes insufficient, by which the ability to retain the lubricant during use as laminated ring is deteriorated. Furthermore, since the pitch of the grinder 9 becomes finer, the life of the grinder itself becomes shorter and the grinder must be replaced frequently, so the productivity is degraded. The present inventors also discovered through experiment that in consideration of the condition of the unevenness 2 transferred onto the metal ring 1 and the life of the grinder, it is preferable to use a grinder with a grain size ranging between #300 and #800.

Next, the method for processing the metal ring 1 according to the present embodiment will be explained. First, opposite ends of a thin sheet of maraging steel are welded together to form a cylindrical drum (not shown). Thereafter, the cylindrical drum is subjected to a solution treatment to homogenize the hardness that has been partially increased by the welding heat, and then the drum is sliced at predetermined widths to form the metal ring 1.

Figure 2:
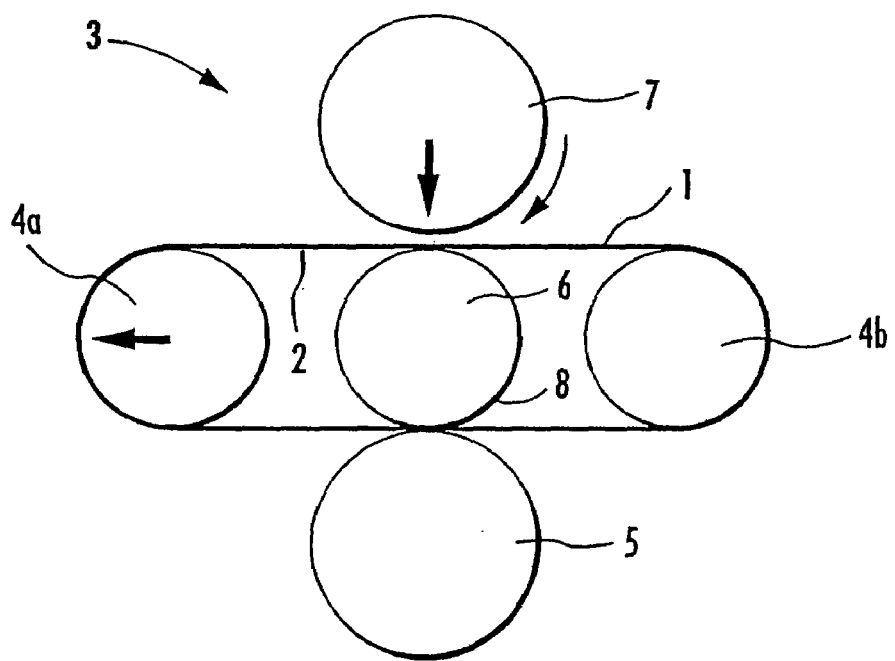
FIG. 2 is an explanatory view showing the main portion of a rolling apparatus for rolling the metal ring.

Thereafter, the metal ring 1 is subjected to a rolling process in the rolling apparatus 3 illustrated in FIG. 2. In the rolling process, the metal ring 1 is disposed around the left and right tension rollers 4a and 4b, and the ring 1 is gripped between the outer circumference rolling roller 7 and the inner circumference rolling roller 6 while it is rolled. Actually, the tension roller 4a is biased toward the left direction of FIG. 2 so as to provide a predetermined tension to the metal ring 1. The outer circumference rolling roller 7 is pressed with predetermined force toward the inner circumference rolling roller 6 while being rotated in the clockwise direction of FIG. 2. The metal ring 1 is rolled between the outer circumference rolling roller 7 and the inner circumference rolling roller 6, and at the same time, the metal ring 1 is rotated in the counterclockwise direction of FIG. 2 by the driving force of the outer circumference rolling roller 7. At this time, the inner circumferential surface of the metal ring 1 is pressed onto the mesh-like unevenness 8 formed to the surface of the inner circumference rolling roller 6, and the unevenness is impressed and transferred to the inner circumferential surface of the metal ring 1 as mesh-like unevenness 2.

Next, the metal ring 1 is subjected to a solution treatment. The solution treatment is performed by placing the metal ring 1 in a heating furnace (not shown) and heating the same to a temperature equal to or above the recrystallization temperature of maraging steel and equal to or below 850° C.

After completing the rolling process and the solution treatment, the metal ring 1 is subjected to nitriding treatment. The nitriding treatment is performed in a nitriding chamber (not shown) into which a mixed gas containing ammonia and nitrogen gas or a mixed gas containing ammonia and RX gas is introduced. In the nitriding chamber, for example, the nitriding treatment is performed by heating the metal ring 1 to approximately 450° C. to 500° C. and maintaining the same for approximately 30 min to 120 min.

The metal ring 1 formed by the above processes had a mesh-like unevenness 2 transferred to the inner circumferential surface thereof having a random width between 25 μm and 250 μm. The compressive residual stress of the metal ring 1 was approximately −1050 N/mm$^2$ (refer to point a of FIG. 4). The interval between the projections formed to the metal ring according to the prior art method was approximately 300 μm and was uniform, and the compressive residual stress on the inner circumferential surface of such prior art metal ring was approximately −800 N/mm$^2$. Thus, the metal ring 1 formed by the method according to the present embodiment had a mesh-like unevenness 2 with a width finer than the prior art, and the compressive residual stress was increased.

Figure 4:
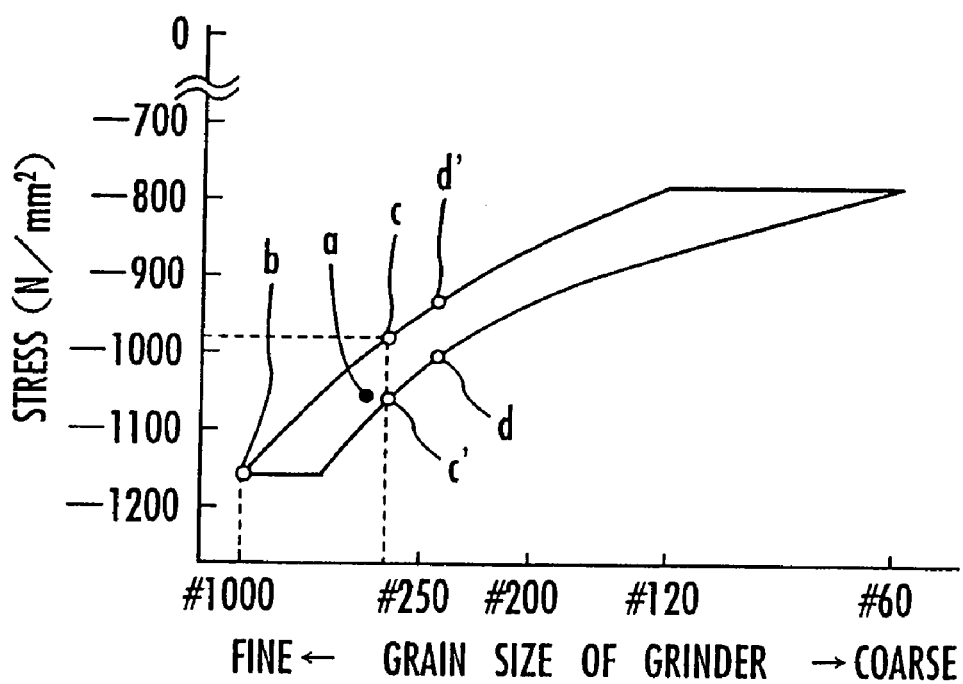
FIG. 4 is a graph showing the relationship between the residual compressive stress on the inner circumferential surface of the metal ring and the grain size of a grinder.

Now, the relationship between the coarseness of the grinder 9 and the compressive residual stress discovered through the experiment conducted by the present inventors and the like is explained with reference to FIG. 4. As illustrated in FIG. 4, the compressive residual stress with respect to the grinder 9 is somewhat dispersed even if a grinder 9 of the same grain size is used, as shown by point c and point c' of FIG. 4, for example. This is considered to be caused by the dispersion in the processing speed or processing time when the rolling roller 6 is processed by the grinder 9.

When a grinder 9 having a coarseness of #1000 was used, the pitch of the mesh-like unevenness 2 became dense, by which the inner circumferential surface of the metal ring 1 was activated and good nitriding treatment was carried out. As a result, the compressive residual stress was approximately −1150 N/mm$^2$ (refer to point b of FIG. 4). As the grinder 9 become coarse, the compressive residual stress was reduced, and when the coarseness of the grinder 9 reached approximately #270, the compressive residual stress became approximately −980 N/mm$^2$ (refer to point c of FIG. 4).

On the other hand, as shown by point d of FIG. 4, there are cases where the compressive residual stress reaches −980 N/mm$^2$ or greater even by using a grinder with a grain size coarser than #250. However, the compressive residual stress may become smaller than −980 N/mm$^2$ as shown by point d' of FIG. 4 due to dispersion of processes, so according to the present embodiment, the coarseness of the grinder 9 should be finer than approximately #270.

According further to the present embodiment, the solution treatment is performed after the rolling process, so the crystal grain size of the unevenness 2 formed to the metal ring 1 becomes finer, and the toughness of the formed metal ring 1 is enhanced. When the metal rings 1 thus manufactured according to the present embodiment are applied as laminated ring to the metal belt of a continuously variable transmission, good lubrication between the plural metal rings 1 is achieved by the unevenness 2. Further, since the ring has high compressive residual stress and enhanced toughness, it is stronger against metal fatigue.

Further, since the inner circumferential rolling roller 6 is processed using a grinder 9, the process time is shortened compared to the case in which a single diamond is used for the process. Moreover, upon performing maintenance of the inner circumference rolling roller 6, the surface can be directly processed by the grinder 9 without having to polish off the unevenness 8 formed to the surface, so the maintenance operation is facilitated.

According to the present embodiment, a grinder 9 made of diamond is used as the grinder for forming the mesh-like unevenness 8 on the surface of the inner circumference rolling roller 6, but the prevent invention is not limited to such example, and a grinder made of alumina or silicon carbide can also be applied.

The invention claimed is:

1. A method for manufacturing a thin-sheet metal ring for use in an endless metal belt, comprising:
   a rolling step for rolling the metal ring using a rolling roller; wherein
   a mesh-like unevenness is formed on at least a surface of the rolling roller coming into contact with an inner circumferential surface of the metal ring;
   the mesh-like unevenness on the rolling roller is formed by applying a grinder having a predetermined coarseness on a rotating rolling roller and moving the grinder in an axial direction of the roller; and
   the mesh-like unevenness formed on the rolling roller is transferred to the metal ring during the rolling step.

2. The method according to claim 1, wherein a width of a groove of the mesh-like unevenness on the rolling roller is formed randomly between 25 μm and 250 μm.

3. The method according to claim 1, wherein the grinder for processing the rolling roller has a coarseness in the grain size range between #300 and #800.

* * * * *